United States Patent
Jones et al.

(10) Patent No.: US 7,567,703 B2
(45) Date of Patent: Jul. 28, 2009

(54) SYSTEM FOR COMBINING MULTIPLE DISPARITY MAPS

(75) Inventors: Graham R Jones, Oxfordshire (GB); Miles Hansard, London (GB)

(73) Assignee: Sharp Kabushiki Kaisha, Osaka (JP)

( * ) Notice: Subject to any disclaimer, the term of this patent is extended or adjusted under 35 U.S.C. 154(b) by 723 days.

(21) Appl. No.: 11/227,508

(22) Filed: Sep. 15, 2005

(65) Prior Publication Data

US 2006/0056727 A1 Mar. 16, 2006

(30) Foreign Application Priority Data

Sep. 16, 2004 (GB) ................... 0420575.3

(51) Int. Cl.
*G06K 9/00* (2006.01)
*G06K 9/36* (2006.01)

(52) U.S. Cl. .................. 382/154; 382/276; 382/284

(58) Field of Classification Search ............. 382/103, 382/154, 209, 276, 284; 345/419, 422; 356/12, 356/22
See application file for complete search history.

(56) References Cited

U.S. PATENT DOCUMENTS 5,917,937 A * 6/1999 Szeliski et al. ............. 382/154
6,507,665 B1 * 1/2003 Cahill et al. ............... 382/154
7,295,697 B1 * 11/2007 Satoh ........................ 382/154

* cited by examiner

*Primary Examiner*—Daniel G Mariam
(74) *Attorney, Agent, or Firm*—Renner, Otto, Boisselle & SKlar, LLP

(57) ABSTRACT

There is provided a method of processing image data, comprising the steps of: (a) providing a plurality of images of a scene; (b) generating a disparity map for each of at least two pairs of images from the plurality of images; (c) transforming each of the disparity maps into a common coordinate system; and (d) merging the transformed disparity maps to provide a single representation of the depth information of the scene.

27 Claims, 5 Drawing Sheets

SYSTEM FOR COMBINING MULTIPLE DISPARITY MAPS

TECHNICAL FIELD

The present invention relates to a method and apparatus for processing image data in order to provide a representation of the three dimensional structure of a scene.

BACKGROUND

Given two views of a scene, it is possible to estimate the binocular disparity between corresponding image features. The disparity of a scene-point is determined by its distance from the cameras used to capture images of the scene. The disparity can be used to predict the position of the corresponding image feature in a synthetic view. A synthetic view may be an image of the scene for which no camera position is available. In practice, the quality of the new image is limited by missing or inaccurate disparity information. For this reason, it is desirable to make repeated estimates of the scene structure, resulting in a disparity map for each of several pairs of views. A disparity map defines the position in each of the two source images of at least one given feature whose position varies with viewpoint. If the scene remains fixed, then it should be possible to combine the different depth estimates.

Video input from a single, moving camera can be used to estimate the structure of a scene. For example, Matthies, Kanade & Szeliski, "Kalman Filter-based Algorithms for Estimating Depth from Image Sequences", International Journal of Computer Vision 3, pp. 209-236, 1989, show that if the camera motion is known, optical flow information can be used to make reliable estimates of the scene depths. Matthies et al. use a Kalman filter to combine estimates based on successive pairs of frames. The uncertainty of each estimate is obtained from the residual error of the optical flow matching procedure. This information is used to make an optimal combination of the individual estimates, subject to an appropriate model of the image noise. If the camera motion is limited to horizontal translation, the video stream can be treated as a series of stereo image pairs with very small separations.

Okutomi & Kanade, "A Multiple Baseline Stereo", IEEE Trans. Pattern Analysis and Machine Intelligence 15(4), 353-363, 1993, disclose a depth estimation algorithm that uses multiple stereo image pairs with different separations. One fixed view is paired with a series of other images, each taken from a different position. This arrangement produces an input which is qualitatively different from the paired video frames used by Matthies et al, as the latter do not contain a fixed view. Another difference is that, rather than combining disparity estimates, the Okutomi & Kanade algorithm combines the evidence for such estimates from the different image pairs. The integrated evidence is then used to make a final decision about the scene structure.

The Okutomi & Kanade algorithm is based on a simple search procedure. The disparity of a given 'source' point is estimated by matching it to the most similar 'target' point in the other image. In more detail, regions of pixels are defined around the source and target points. The sum of squared colour differences between the source region and each target region is then computed. The underlying disparity is estimated by searching for the lowest value of this function, assuming that the correct target point minimizes the squared difference. Since the cameras are parallel, the search is only performed in the horizontal direction, resulting in a 1-D function at each image point. As is well known, there are several problems with this approach. Firstly, the correct target point may not be associated with the lowest matching error, meaning that there may be false minima in the disparity function. Secondly, it may be impossible to determine the precise location of the true match, meaning that the minimum of the disparity function may be poorly defined.

Okutomi & Kanade show that these problems can be countered by using a range of different camera separations. The point matching costs for each image pair are computed with respect to 'inverse depth', which can be defined as disparity divided by camera separation. It follows that the resulting functions, one for each stereo image pair, will share a single parameterisation. This means that the errors can be added together, and that the true inverse depth of a given point can be estimated from the minimum of the composite function. Okutomi & Kanade show that this procedure has two important consequences. Firstly, false minima in the individual matching functions tend to be suppressed in the composite function. Secondly, the true minimum tends to become more well-defined as the individual functions are added.

Szeliski & Golland, Microsoft Corp: "Method for Performing Stereo Matching to Recover Depths, Colors and Opacities of Surface Elements", 1997, U.S. Pat. No. 5,917,937, disclose another multi-view image representation. This involves mapping a collection of images (typically three or more) into a common coordinate system. The necessary projective transformations can be derived from the positions, orientations and internal parameters of the original cameras. Each point in the common image coordinates is associated with a range of possible scene depths. Each scene depth is in turn associated with a colour from each input view. This representation is a generalized disparity space which extends the two view structure used by Marr & Poggio, "Cooperative computation of stereo disparity", Science 194, 283-287, 1976.

Rather than using the different images to estimate a disparity map in the common coordinate system, Szeliski & Golland render a novel view directly. This is achieved by measuring the mean and variance of the colours at each point in the disparity space. The appearance of each scene point is expected to be consistent across the different input images and so the corresponding variances should be low. The mean colour at each point is associated with an opacity which is inversely proportional to the variance. Szeliski & Golland show that pixels in a new view can be estimated by compositing the opacity-weighted mean colours along each disparity ray.

Leclerc, Luong and Fua, "Measuring the Self-Consistency of Stereo Algorithms", Proc. European Conference on Computer Vision 2000, pp. 282-298, disclose a procedure for measuring the self consistency of stereo disparity maps. This is intended as a means of evaluating binocular correspondence algorithms, and of determining appropriate parameter settings. It is assumed that if a number of disparity maps are estimated from different images of the same scene, their mutual consistency will be representative of their accuracy. This assumption means that no ground-truth data is required by the evaluation procedure. As in the Szeliski & Golland rendering scheme, the camera parameters are used to map the images into a common coordinate system. A matched pair of points, one from each of two images, defines a single point in the scene. A subsequent match between one of the pair, and another point, from a third image, should define the same scene-point. The Leclerc, Luong & Fua algorithm evaluates this consistency condition over a set of disparity maps obtained from images of a single scene.

Viola & Wells, "Alignment by Maximisation of Mutual Information", International Journal of Computer Vision 24(2), pp. 137-154, 1997, describe an algorithm that can be used to bring images and 3-D models into registration. This is achieved by optimizing the mutual information between the data sets that are being aligned. The advantage of the mutual information measure is that each data set can measure a different function of the underlying structure. For example, a 3-D model can be aligned to an image by maximizing the mutual information between the surface-normal vectors and the pixel intensities. This can be achieved despite the lack of a clear definition of distance between the normals and the intensities.

SUMMARY

According to a first aspect of the invention, there is provided a method of processing image data, comprising the steps of: providing a plurality of images of a scene; generating a disparity map for each of at least two pairs of images from the plurality of images; transforming each of the disparity maps into a common coordinate system; and merging the transformed disparity maps to provide a single representation of the depth information of the scene.

The common coordinate system may comprise the position of the view point of one of the plurality of images. The one of the plurality of images may be the centralmost of the plurality of images.

Step (c) may comprise applying a shear transformation to each of the disparity maps.

The transformation may produce a plurality of disparities at each location in the common coordinate system. The largest of the disparities may be selected at each location in the common coordinate system.

A function may be defined to record the locations in the single representation for which no disparity is available. The function may be used to generate a disparity value for each location in the single representation for which no disparity is available. The disparity value may be generated by interpolation between the values of the disparity at each side of the region for which no disparity is available.

Each of the transformed disparity maps may be expressed in terms of a parameterisation. The parameters may comprise a view-point parameter, the position, and the scale factor of the transformation. The parameters of the transformation between each of the disparity maps and the disparity map of the common coordinate system may be determined using a search procedure. The search procedure may comprise minimising the squared distances between the disparity values at points of each of the disparity maps and the disparity map of the common coordinate system. Alternatively, the search procedure may comprise maximising the mutual information of each of the disparity maps and the disparity map of the common coordinate system. The mutual information may comprise a measure of the dependence between (i) the joint probability distribution, and (ii) the product distribution of the disparities in each of the disparity maps and the disparity map of the common coordinate system. The search may comprise a Golden Section Search.

The single representation of step (d) may comprise an average of the transformed disparity maps. The average may be a weighted average. The weights may be derived from uncertainties in each of the disparity maps. Alternatively, the weights may be based upon the index of each of the disparity maps.

The above aspect of the present invention may be applied to the output of a stereo-matching algorithm.

In accordance with a further aspect of the present invention, there is provided a method of generating a depth map of a scene, including a method in accordance with the first aspect of the invention.

In accordance with a further aspect of the present invention, there is provided a method of synthesising a novel view of a scene, comprising generating depth information for the novel view in accordance with the first aspect of the present invention.

In accordance with a still further aspect of the present invention, there is provided a method of evaluating a stereo-matching algorithm, comprising optimising a consistency measure with respect to the parameterisation of the transformation obtained in accordance with the first aspect of the present invention, the value of the consistency measure being indicative of the algorithm performance.

A further aspect of the present invention provides a method of determining parameter settings for a stereo-matching algorithm, comprising optimising the algorithm in accordance with the previous aspect of the present invention, and varying the parameter settings until two or more disparity maps achieve a fixed level of consistency.

In accordance with a further aspect of the present invention, there is provided a program for controlling a computer to perform a method in accordance with the above aspect of the present invention. The program may be stored on a storage medium. The program may be transmitted across a communications network. In accordance with a further aspect of the invention, there is provided a computer programmed to perform the method in accordance with the above aspects of the invention.

In accordance with a still further aspect of the present invention, there is provided an apparatus for processing image data, comprising: means for providing a plurality of images of a scene; means for generating a disparity map for each of at least two pairs of images from the plurality of images; means for transforming each of the disparity maps into a common coordinate system; and means for merging the transformed disparity maps to provide a single representation of the depth information of the scene.

DETAILED DESCRIPTION

The embodiments of the present invention can be used to merge a number of disparity maps into a single representation. This differs from the Okutomi & Kanade method, and from the Szelsiki & Golland method, both of which produce a single representation from a number of images, rather than from disparity maps. A further application of the embodiments of the present method is the evaluation of stereo-matching algorithms. This objective is shared with the Leclerc, Luong & Fua algorithm, although the approach described below is quite different.

The basic concept of the embodiments of the present invention is that a number of disparity maps, estimated from images of the same scene, may be reprojected from a common viewpoint. Once the disparities have been superimposed in this way, they can be merged into a single representation. There are two advantages to this procedure. Firstly, where there are multiple estimates of the same disparity, it should be possible to obtain a more accurate value. Secondly, by merging disparity maps from different viewpoints, a more complete representation of the scene can be obtained.

An advantage of the merging process described below is that it can be applied to the output of any stereo-matching algorithm. The process can be used to improve the accuracy and generality of existing stereo-matching systems. By contrast, although the Okutomi & Kanade and Szeliski & Golland algorithms combine information from several images, they do this as part of a specific matching procedure. The Matthies, Kanade & Szeliski method is not tied to a particular matching procedure, but the disparity estimates made from each image pair are dependent on all of the previous estimates. It would not be straightforward to combine any of these three approaches with an alternative stereo-matching algorithm.

The procedure described by Leclerc, Luong & Fua is, like the present approach, intended to work with the output of any matching algorithm. However, their method requires the matched image points to be back-projected into the scene. This means that accurate estimates of the position, orientation and internal parameters of the cameras are required. The embodiments of the present method do not require this information; instead, it is simply assumed that the original images were rectified.

There are two further advantages of the method described below. Since the visible parts of the scene vary from one camera position to another, there will be gaps in the computed disparity maps. These gaps are properly accounted for. Further, the methods described below are efficient and straightforward to implement.

Figure 1:
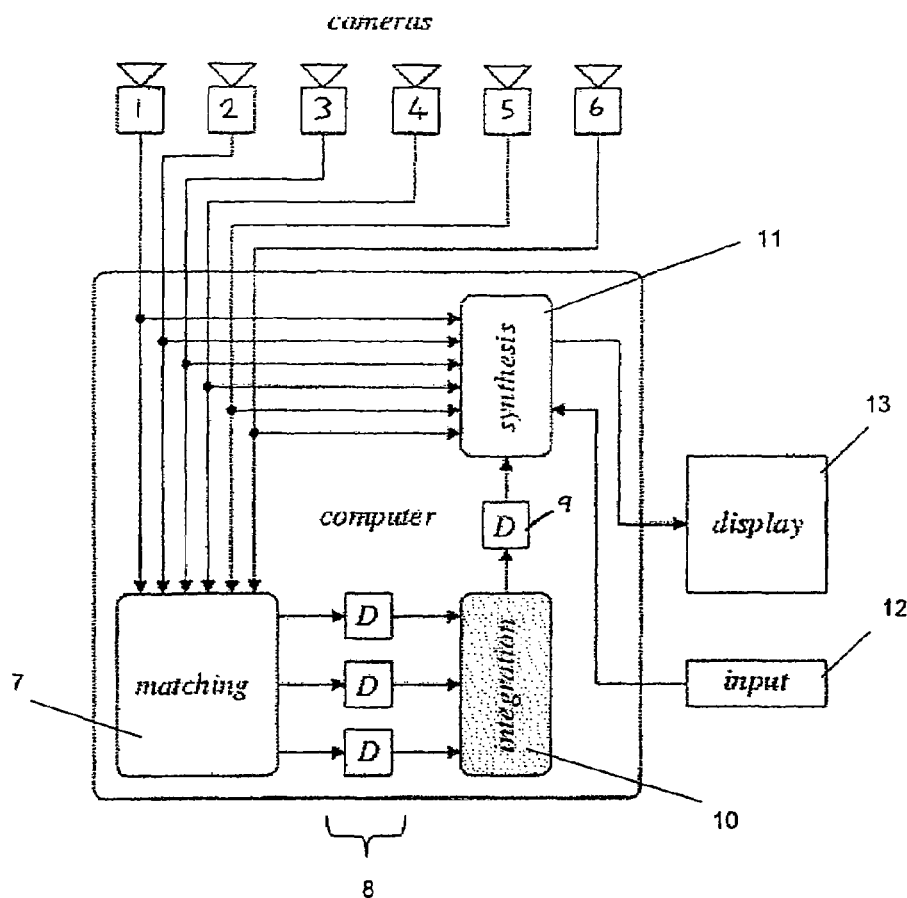
FIG. 1 is a schematic diagram of a view synthesis system in accordance with an embodiment of the present invention.

The methods described below can be used as part of a view synthesis system, as shown in FIG. 1. Cameras 1 to 6 are positioned so as to capture six different images of a scene. The images may be captured simultaneously or successively by a single camera moved to each position in turn. The matching unit 7 produces a number of disparity maps 8 representing the same scene. An integration unit 10 which performs the methods of the embodiments described below integrates the disparity maps 8 into a single disparity map 9. A synthesis unit 11 is used to render novel views of the scenes, not corresponding to the original camera positions. The position of the novel viewpoint is controlled by the user via an input 12. The novel view of the scene is displayed on display unit 13.

The methods described below can also be used to evaluate existing stereo matching algorithms. The methods may also be used to determine the appropriate parameter setting for a stereo matching algorithm based on real image data.

Figure 8:
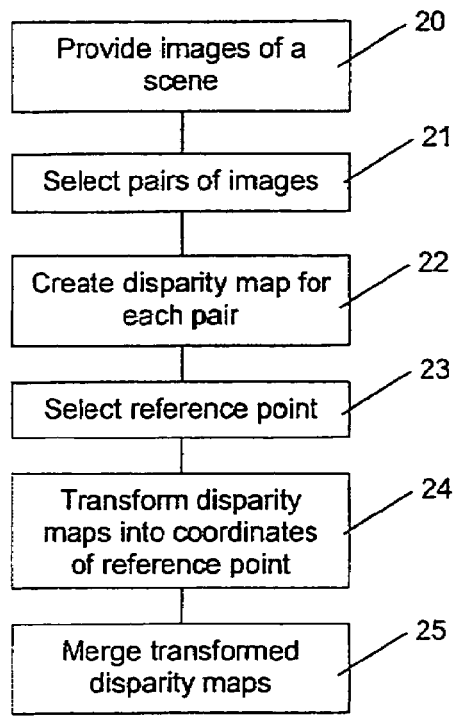
FIG. 8 is a flow diagram illustrating the method of an embodiment of the present invention.

FIG. 8 is a flow diagram showing the basic steps of the embodiments of the method of the present invention. At step 20, images are provided of a scene, such as those taken by cameras 1 to 6 of FIG. 1. At step 21, pairs of images are selected from those images taken at step 20 and at step 22 a disparity map is created for each of the selected pairs of images. At step 23, a reference point is selected and then at step 24, the disparity maps are transformed into the coordinates of the reference point. At step 25, the transformed disparity maps are merged together to provide a single representation of the depth information of the scene.

It is convenient to assume that the original cameras had the same orientation, and that they were positioned along a common baseline. This would be the case if, for example, the images were obtained from a single camera which was moved along a rail. In fact, it is usually possible to impose this relationship by rectifying a general set of images. In particular, it will be assumed that the baseline is parallel to the horizontal axis of the common coordinate system.

In principle, the relationships between the disparity maps are determined by the relative camera positions. However, even if this information is available, small errors can lead to very poor alignments. For this reason, the relative positions are not required here, although approximate values can be used as initial estimates for the optimisation procedures described below.

Figure 2:
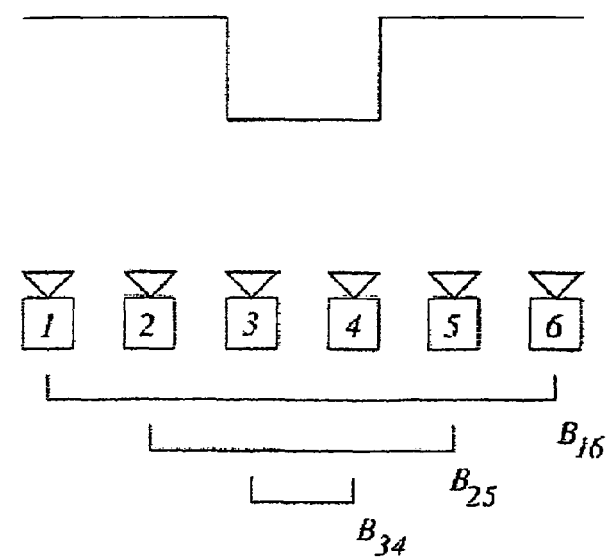
FIG. 2 illustrates the camera pairings in accordance with an embodiment of the present invention.
Figure 3:
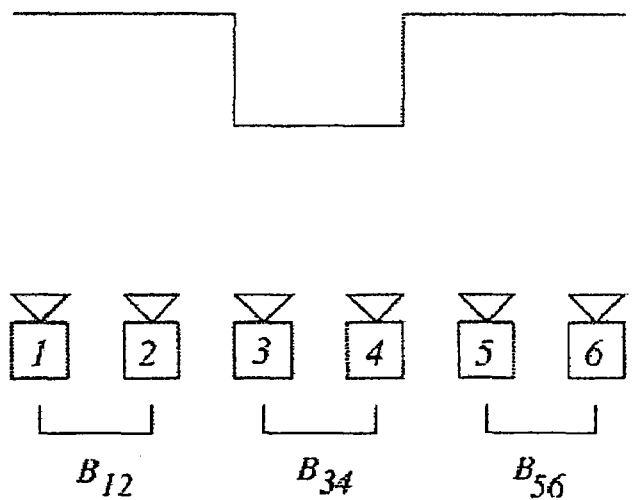
FIG. 3 illustrates the camera positions in accordance with a further embodiment of the present invention.

Given a series of images obtained from viewpoints along a common baseline, a set of stereo-image pairs can be defined in various ways. For example, it may be required that the average (or 'cyclopean') viewpoints of the different pairs coincide. This results in the nested pattern of baselines shown in FIG. 2, where the midpoints of pairings $B_{16}$, $B_{25}$ and $B_{34}$ all coincide. An alternative requirement would be for the cyclopean viewpoints to be equally separated, as in FIG. 3, where the pairings $B_{12}$, $B_{34}$ and $B_{56}$ are spatially distinct. It should be emphasized that the present approach can be applied to any set of stereo-image pairs from a common baseline, and that FIGS. 2 and 3 are examples only.

To formalize this description, suppose that the input consists of K different disparity maps, $D_k(i,j)$. It will be necessary to express each of these as a function $D_k(i,j,t_k)$ of a viewpoint parameter $t_k$, as well as of a position (i,j). The functions will be defined such that, for appropriate viewpoint parameters $t_k$, the K disparities $D_k(i,j,t_k)$ are determined by the same scene point. It will also be required that $D_k(i,j,0)=D_k(i,j)$. For the 'adjacent' camera-arrangement shown in FIG. 3, only the camera-positions (not the separations) are variable. This means that it should be possible to equate the disparities to a reference value $D_n(i,j,t_n)$, such that $D_k(i,j,t_k)=D_n(i,j,t_n)$, k≠n, for appropriate values $t_k$. For the nested camera-arrangement in FIG. 2, the K disparities $D_k(i,j,0)$ are already determined by the same scene point. However, because the separations are variable, the disparities can only be equated by introducing scale factors; $D_n(i,j,0) \approx s_k D_k(i,j,0)$. The parameters $s_k$ are proportional to the corresponding camera separations.

In general, the cyclopean viewpoints will not coincide, and neither will the camera positions be evenly separated. This means that both viewpoint parameters $t_k$ and the scale-factors $s_k$ will have to be determined:

$$D_n(i,j,t_n) \approx s_k D_k(i,j,t_k). \qquad [1]$$

A reference viewpoint n will be chosen from the K cyclopean positions, and the other K−1 disparity maps will be aligned to $D_n$. It is natural to take the most 'central' viewpoint as the reference, as this choice minimizes the average distance to other K−1 viewpoints.

The functions $D_k(i,j,t_k)$ are defined as shear transformations of the original data. This means that as $t_k$ is varied, each depth-plane in the disparity map moves in a direction parallel to the camera baseline. The amount of movement is proportional to the disparity of a given plane. Hence, for a given value of $t_k$, a new function of $D_k(i,j+t_k D(i,j))$ is obtained. However, this simple definition is impractical, because as the viewpoint parameter is varied, previously visible surfaces may become occluded, and vice versa. It follows that the function might not have a unique value at a given position (i,j). For this reason, the parameterisation is actually defined as follows;

$$D_k(i, j, t_k) = \max\left\{ \begin{array}{c} D_k(i, j_0) : j_0 + t_k D_k(i, j_0) \in \\ \left[j - \frac{1}{2}, j + \frac{1}{2}\right] \end{array} \right\} \quad [2]$$

In this equation, the shear transformation is allowed to produce a number of disparities at each position (i,j). The maximum available disparity is returned at each point, which means that any occluded surfaces are ignored. Note that the definition does not assume that $t_k D_k(i,j_0)$ is a whole number of pixels. It is also necessary to address the problem of undefined regions, where for a given position and value of $t_k$, no disparity is available. According to one embodiment, the disparity is interpolated across any gaps in the $D_k(i,j,t_k)$ functions. In a further embodiment, to avoid introducing a particular interpolation model, the method keeps track of the undefined regions and ignores them. This is achieved using functions $V_k(i,j,t_k)$, such that $V_k(i,j,t_k)=1$ wherever $D_k(i,j,t_k)$ is valid, and $V_k(i,j,t_k)=0$ elsewhere.

It is straightforward to compute $D_k(i,j,t_k)$ and $V_k(i,j,t_k)$, as follows. By iterating over positions $j_0=1 \ldots J$, a temporary data structure $f_k(i,j_0)$ can be constructed;

$$f_k(i,j_0) = j_0 + t_k D_k(i,j_0).$$

The function defined in Equation 2 can then be constructed by a second iteration over $j_0=1 \ldots J$ which uses $f_k(i,j_0)$ to define horizontal positions in $D_k(i,j,t_k)$. More precisely, for each value of $j_0$, the disparity $D_k(i,j_0)$ is compared to the value of a new position, obtained by rounding $f_k(i,j_0)$ to the nearest integer. The larger of the two disparities is then stored at the new position. This can be expressed as follows;

$$D_k(i, j, t_k) \leftarrow \max\{D_k(i, j, t_k), D_k(i, j_0)\} \text{ where } j = \text{round } f_k(i, j_0)$$

$$V_k(i, j, t_k) \leftarrow \begin{cases} 0 \text{ if } D_k(i, j, t_k) \text{ is undefined} \\ 1 \text{ otherwise.} \end{cases}$$

where the notation 'a←b' means that the value b is assigned to the variable a. The above procedure can be applied independently to each of the scanlines $i=1, 2 \ldots I$.

Figure 4:
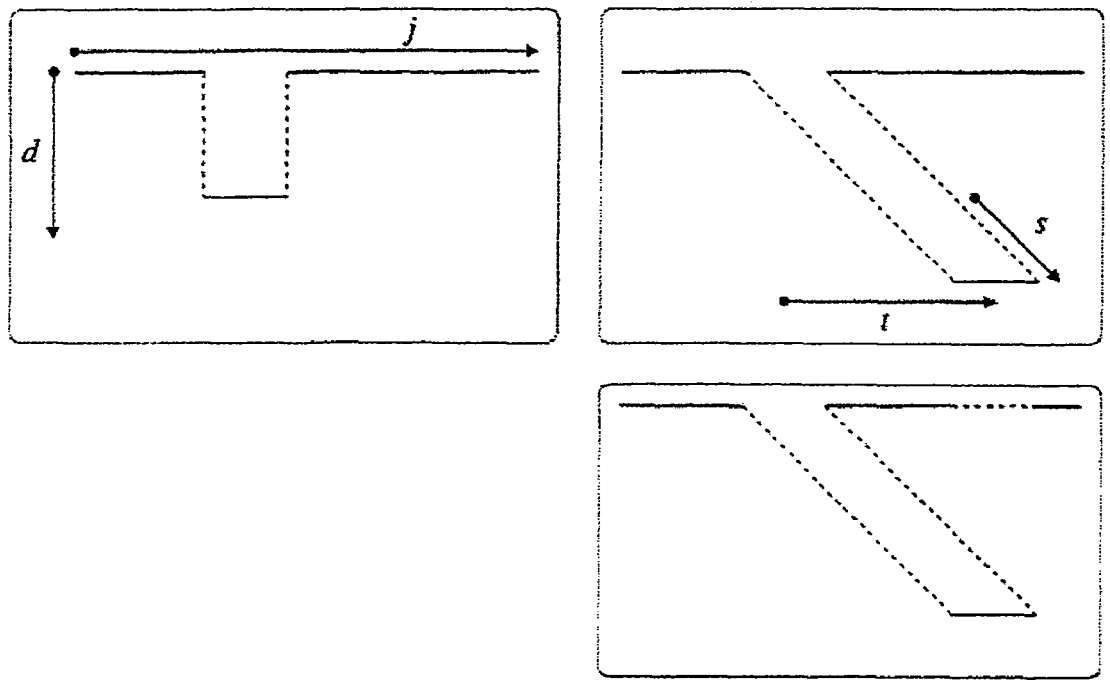
FIG. 4 illustrates disparity data obtained from the scene of FIGS. 2 and 3.

FIG. 4 illustrates a slice through some disparity data, obtained from the scene shown in FIGS. 2 and 3. The horizontal and disparity coordinates, j and d respectively, are labelled. The disparity is inversely proportional to distance from the camera-baseline. A transformation of the data is shown in the top-right. The transformation comprises a shear and a scale, parameterised by t and s, respectively. The valid subset of data, after the transformation is shown in the bottom right. After the transformation, some j-positions are associated with more than one disparity. This is resolved by discarding all but the largest of the available disparities, as in Equation 2.

Having defined the model in Equation 1, the parameters $s_k$ and $t_k$ must be determined, such that $D_k(i,j,t_k)$ is aligned to $D_n(i,j)$, with $k \neq n$. It is not possible to solve directly for the parameters, because the data is 'unlabelled'. In other words, given two disparity maps, $D_k(i_k,j_k,t_k)$ and $D_n(i_n,j_n,t_n)$, the mapping between $j_k$ and $j_n$ is not known (although the mapping $i_k=i_n$ is known, assuming that the images are rectified). The parameters can, however, be determined by a suitable search procedure.

Some or all of the $t_k$ and $s_k$, $k \neq n$, may be known from the physical camera locations. Nonetheless, small errors in these parameters can have significant effects on the quality of the alignment. For this reason, it is usually worthwhile to optimise all of the parameters with respect to an objective function measuring the disagreement (or agreement) between $D_k(i,j,t_k)$ and $D_n(i,j,0)$. Estimates derived from the camera positions can be used as starting points for a search through the possible values of $s_k$ and $t_k$.

Two possible objective functions are described below. In practice, both are convex functions over the search range. This means that an efficient optimisation procedure, such as Golden Section search (William H. Press, Brian P. Flannery, Saul A. Teukolsky & William T. Vetterling, "Numerical Recipes in C: The Art of Scientific Computing". Cambridge University Press, 1992) can be used.

Distance Minimisation

The most straightforward way to evaluate the alignment between $D_k(i,j,t_k)$ and $D_n(i,j,0)$ is to sum the pointwise distances between the two functions over all valid positions (i,j), where $V_k(i,j,t_k)=1$. It is possible to search for the scale factor $s_k$ along with the parameter $t_k$, during each alignment. However, this would make the optimisation procedure more complicated, and more computationally demanding. Instead, the scale factors can simply be fixed, by requiring that the average value of $D_k$ be equal to the average value of $D_n$ at a given alignment. These choices lead to the following definitions;

$$E_n(D_k, t_k) = \frac{1}{|V_k|} \sum_i \sum_j \left| \frac{1}{s_k} D_k(i, j, t_k) - \frac{1}{s_n} D_n(i, j, 0) \right|^2 \quad [3]$$

for $i, j$ such that $V_k(i, j, t_k) = 1$ $$|V_k| = \sum_i \sum_j V_k(i, j, t_k) \text{ and}$$

$$s_k = \sum_i \sum_j |D_k(i, j, 0)|^2$$

The sum which defines $E_n$ is taken over the valid points, for which $V_k(i,j,t_k)=1$. The sum is normalised by the total number of valid disparities, $|V_k|$. The function $E_n(i,j,t_k)$ can be minimized for each of the K-1 views, using a Golden Section search, as described above. The advantage of the distance measure is that it can be evaluated quickly. The disadvantage is that the fixed scale factors $s_k$ and $s_n$ may lead to a biased estimate of $t_k$, particularly if viewpoints n and k are significantly different.

Consistency Maximisation

This embodiment has several advantages over the distance minimisation process defined previously. Suppose that the variable $d_k$ can be any disparity in $D_k(i,j,t_k)$, for a given $t_k$, and that the variable $d_n$ can be any disparity in $D_n(i,j,t_n)$, with $k \neq n$. Two probability distributions can now be defined: the joint distribution $pr(d_k,d_n)$ and the product distribution, $pr(d_k)pr(d_n)$. The mutual information $H_n(D_k,t_k)$ can be interpreted as a measure of dependence between the two distributions. In particular, if $D_k(i,j,t_k)$ is independent of $D_n(i,j,0)$, then $H_n(D_k,t_k)=0$. In general, the dependence measured by $H_n$ will be maximised when the two disparity maps are correctly aligned. The mutual information, measured in bits, is defined as $$H_n(D_k, t_k) = \sum_{dk} \sum_{dn} pr(d_k, d_n) \log_2 \frac{pr(d_k, d_n)}{pr(d_k) pr(d_n)}, \quad [4]$$

where $d_k \in D_k(i, j, t_k)$, $V_k(i, j, t_k) = 1$, and $d_n \in D_n(i, j, 0)$, $V_n(i, j, 0) = 1$.

The convention $0 \log_2 (0)=0$ is used. The advantage of $H_n(D_k,t_k)$ over $E_n(D_k,t_k)$ is that the scale factors $s_k$ can be ignored. This is because the mutual information is invariant to monotonic transformations, such as scaling of the variables.

Figure 7:
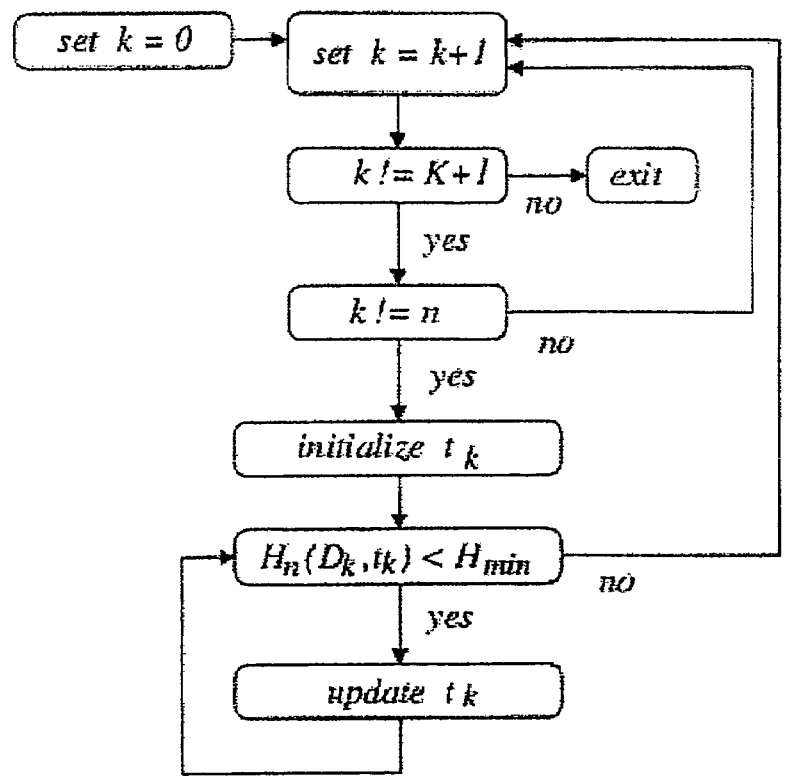
FIG. 7 is a flow diagram illustrating the mutual information disparity alignment algorithm in accordance with an embodiment of the present invention.

The probabilities $pr(d_k,d_n)$ and $pr(d_k) pr(d_n)$ can be computed from histograms of the disparity data, using bin-widths of one pixel. It is not necessary to use a 2-D array to build the histogram. A binary tree containing the bins, lexicographically indexed by $(d_k,d_n)$, will usually be more space-efficient, and not significantly less time-efficient. As described above, the mutual information can be maximized by a procedure such as a Golden Section search. A suitable algorithm is shown in the flow diagram of FIG. 7, showing the mutual-information disparity alignment algorithm. Each viewpoint k=1 . . . K is processed, provided that k≠n, where n is the reference viewpoint. The parameter $t_k$ is suitably initialised (e.g. from approximate knowledge of the baseline ratios). The remaining loop is an iterative procedure, such as a Golden Section search, which tries to increase the mutual information $H_n(D_k,t_k)$ by updating $t_k$. Once the information is greater or equal to a threshold $H_{min}$, the next view is processed.

A set of disparity maps that have been aligned to a common viewpoint, as described above, can be merged into a single representation. There are two advantages to this. Firstly, the accuracy of the individual estimates should increase since random errors will tend to cancel out. Secondly, the coverage of the composite representation will usually be greater than that of the individual estimates. In general, a weighted average of the following form is used;

$$D^*(i, j) = \frac{\sum_{k=1}^{K} s_k w_k(i, j) D_k(i, j, t_k)}{\sum_{k=1}^{K} w_k(i, j)}, \quad [5]$$

where the parameters $s_k$ and $t_k$ have been optimised as described above. Many matching algorithms provide an uncertainty $\sigma_k^2(i,j)$ along with each disparity estimate $D_k(i,j)$. For example, if the disparity has been estimated by minimizing a measure of mismatch, then the uncertainty can be obtained from the curvature of this function about the minimum. If disparity uncertainties are available, then the weights can be defined as $w_k(i,j)=1/\sigma_k^2(i,j)$. Alternatively, the weights may depend on k only. For example, disparities estimated from wider baselines may be down-weighted, due to an increased number of false matches. If no uncertainty values are available, then setting $\sigma_k(i,j)=1$ gives a value $D^*(i,j)$ which is a simple average of the individual estimates.

The form of Equation 5 suggests that all K disparity maps must be available before a combined estimate can be made. This would imply that the required storage space is proportional to the number of disparity maps. This is not the case, as the combined estimate can be recursively computed. To see this, suppose that the total number of disparity maps, K is variable, and that a combined estimate $D^*_{K+1}(i,j)$ must be computed from the existing estimate $D^*_K(i,j)$, along with the new disparity map $D_{K+1}(i,j,t_{K+1})$. The weighted average in Equation 5 can be written as:

$$D^*_1(i, j) = D_1(i, j, t_1), \quad [6]$$

$$D^*_{K+1}(i, j) = D^*_K(i, j) + \frac{w_{K+1}(i, j)}{\sum_{k=1}^{K+1} w_k(i, j)} \left( \frac{s_{K+1} D_{K+1}(i, j, t_{K+1}) -}{D^*_K(i, j)} \right).$$

This scheme means that, in effect, only one disparity map is ever stored. To see the relationship between Equations 5 and 6, consider two disparity maps, $D_1$ and $D_2$ with associated weights $w_1$ and $w_2$ (the coordinates i, j and parameters $s_k$ and $t_k$ are ignored here). With the initial value K=1, Equation 6 can be used to compute a combined estimate from the two disparity maps;

$$D^*_2 = D_1 + \frac{w_2}{w_1 + w_2}(D_2 - D_1) = \frac{w_1}{w_1 + w_2}D_1 + \frac{w_2}{w_1 + w_2}D_2.$$

Figure 5:
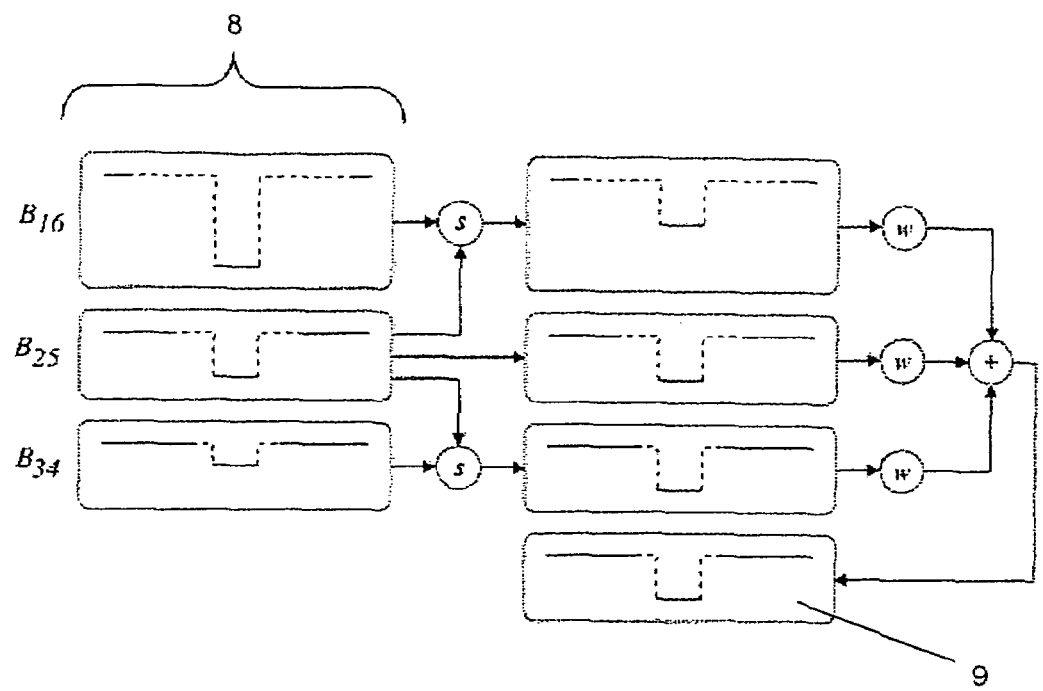
FIG. 5 is a flow diagram illustrating the combination of disparity maps obtained in FIG. 2.

This is a weighted average, which could equally have been obtained from Equation 5. FIG. 5 illustrates the integration of the three disparity maps obtained in FIG. 2. The pair $B_{25}$ is used as a reference, towards which $B_{16}$ and $B_{34}$ are scaled. The S indicates transformations, the w indicates a weighting, and the "+" indicates the merging of the three disparity maps. The output, shown at the bottom, is a weighted sum of the three transformed functions. The completeness of the output is equal to that of the most complete input ($B_{34}$ in this example).

Figure 6:
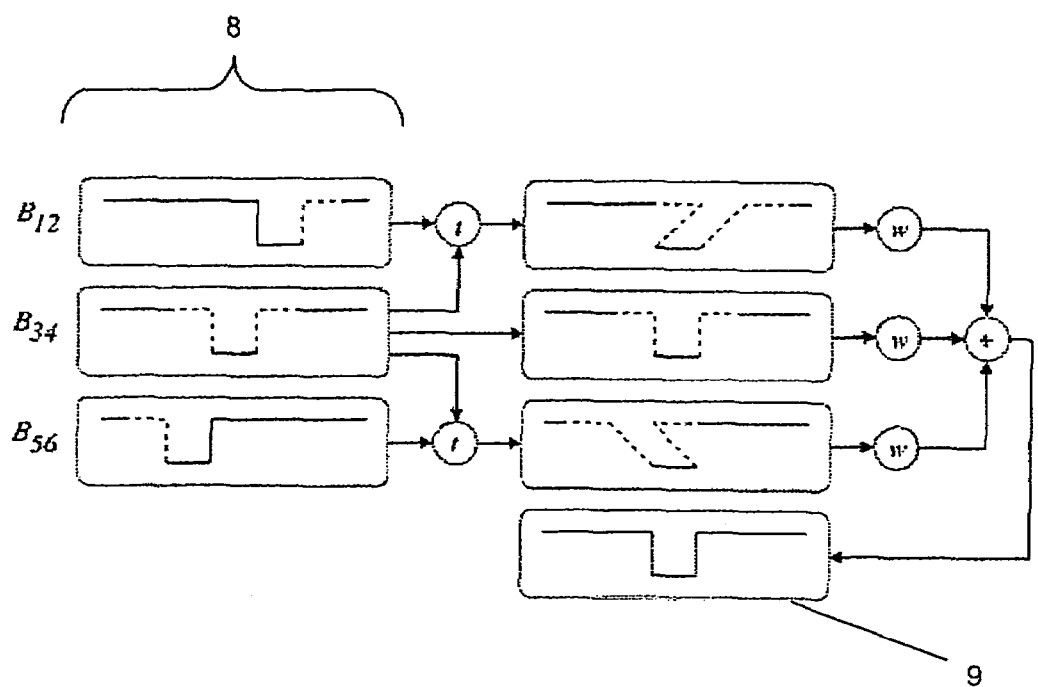
FIG. 6 is a flow diagram illustrating the combination of disparity maps obtained in FIG. 3.

FIG. 6 illustrates the integration of three disparity maps obtained in FIG. 3. The pair $B_{34}$ is used as a reference, towards which $B_{12}$ and $B_{56}$ are sheared. The S indicates transformations, the w indicates a weighting, and the "+" indicates the merging of the three disparity maps. The output, shown at the bottom, is a weighted sum of the three transformed functions. The output is more complete than any of the individual inputs.

The alignment methods which have been described above can also be used in the evaluation of stereo matching algorithms. In principle, the performance of a stereo matching algorithm can be evaluated by transforming the image-coordinates and estimated disparities into physical positions, and comparing these with ground-truth measurements of the scene. This process is often impractical, as it requires a detailed model of the scene, as well as properly calibrated cameras.

For this reason, it is useful to define alternative, more easily evaluated measures of algorithm performance. In particular, if the algorithm produces unbiased estimates of the scene structure, then the consistency of the results (with respect to different input views) is a useful measure of performance. Two measures of consistency are introduced here. A simple approach is to form sums of the measures defined in Equations 3 and 4. For example, using the mutual information measure;

$$H_n^*(D_k, t_k) = \frac{1}{K-1} \sum_{k=1}^{K} H_n(D_k, t_k), k \neq n. \quad [7]$$

One problem with this definition is that it depends on the choice of reference view, n. For most configurations, it is natural to choose the most central viewpoint as the reference. Nonetheless, it may be useful to consider a more symmetric measure; the average pairwise information, $$H^*(D_k, t_k) = \frac{2}{K(K-1)} \sum_{n=1}^{K} \sum_{k=n+1}^{K} H_n(D_n, t_k) \quad [8]$$

where $K(K-1)/2$ is the number of terms in the sum. In principle, it would also be possible to evaluate the joint mutual information of a given alignment. In practice, this could only be estimated if the undefined regions of the functions $D_k(i,j, t_k)$ were interpolated in some way. The strategy of ignoring the undefined regions would make the estimation of probabilities $pr(d_1, d_2 \ldots d_K)$ impractical, because for real data, the number of available samples would tend to zero as K increases.

Either of the consistency measures defined in equations 7 and 8 could be used as the basis of an evaluation procedure. For example, a number of disparity maps are computed from a set of images, as shown in FIGS. 2 and 3. The consistency of these estimates is then evaluated by the optimization method described above. The process is then repeated for other algorithms, the most consistent of which will be preferred. As was indicated above, a problem with this approach is that the disparity estimates may be systematically biased, in which case they may be consistent but not accurate. However, in many matching algorithms, bias is often deliberately introduced, e.g. in the form of a weighted smoothness constraint. Hence it may be possible to judge an algorithm by evaluating the consistency of the results as a function of the bias.

The same principles may be used to help determine suitable parameter settings for a stereo matching algorithm. For example, it may be appropriate to impose a strong smoothness constraint in order to estimate the structure of a simple indoor scene. However, if the scene were more complex, e.g. a landscape containing foliage, then the smoothness constraint would have to be relaxed.

The measures defined in equations 7 and 8 could be used to determine the smoothness (or other parameter) setting. For example, the smoothness setting could be defined as the minimum value that achieves a fixed degree of consistency between disparity maps representing the same scene. The actual setting could be found, as before, by a standard search procedure.

Figure 9:
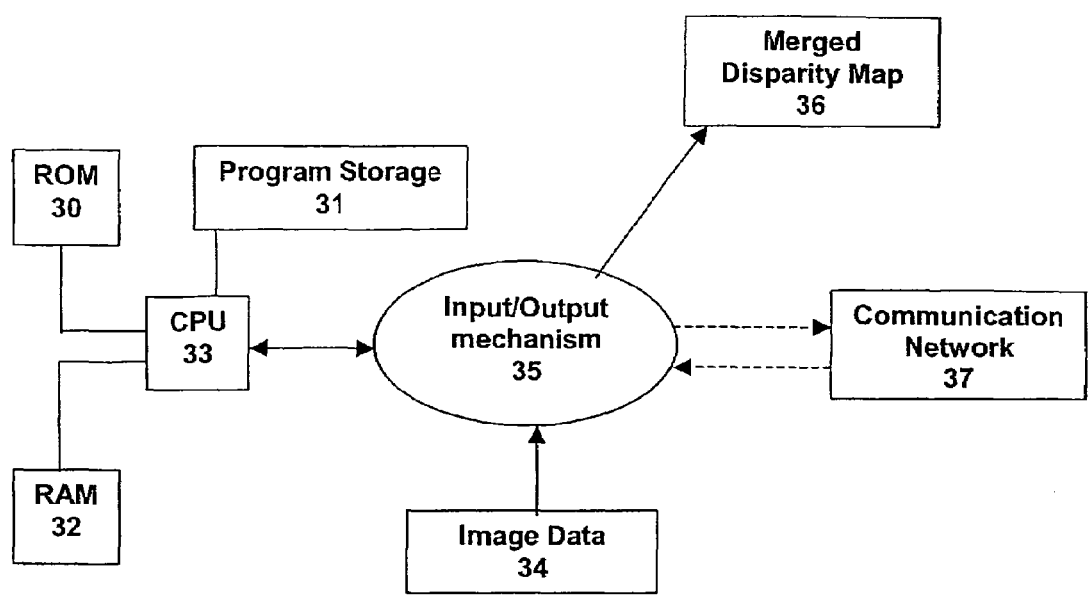
FIG. 9 is a schematic diagram of a computer in accordance with an embodiment of the present invention.

The schematic diagram of FIG. 9 illustrates a computer for performing the above-described image processing. A central processing unit (CPU) 33 is connected to a read-only memory (ROM) 30 and a random access memory (RAM) 32. The CPU is provided with image data 34 from the image sources via an input/output mechanism 35. The CPU then performs the disparity map and transformation to provide the merged disparity map 36, in accordance with instructions provided by the program storage 31 (which may be part of the ROM 30). The program itself, or any of the inputs and/or outputs to the system may be provided or transmitted to/from a communication network 37, which may be, for example, the internet.

It will be appreciated by the skilled person that various modifications may be made to the above embodiments without departing from the scope of the present invention as set out in the accompanying claims.

What is claimed is:

1. A method of processing image data, said method comprising the steps of:
   (a) providing a plurality of images of a scene;
   (b) generating a disparity map for each of at least two pairs of images from said plurality of images;
   (c) transforming each of said disparity maps into a common coordinate system; and
   (d) merging said transformed disparity maps to provide a single representation of depth information of said scene.

2. A method as claimed in claim 1, wherein said common coordinate system comprises a position of a viewpoint of one of said plurality of images.

3. A method as claimed in claim 2, wherein said one of said plurality of images is a centralmost of said plurality of images.

4. A method as claimed in claim 1, wherein said step (c) comprises applying a shear and scale transformation to each of said plurality of said disparity maps.

5. A method as claimed in claim 1, wherein said step (c) produces a plurality of disparities at each location in said common coordinate system.

6. A method as claimed in claim 5, wherein the largest of said disparities is selected at each said location in said common coordinate system.

7. A method as claimed in claim 1, wherein a function is defined to record locations in said single representation for which no disparity is available.

8. A method as claimed in claim 7, wherein said function is used to generate a disparity value for each said location in said single representation for which no disparity is available.

9. A method as claimed in claim 8, wherein said disparity value is generated by interpolation between values of disparity at each side of a region for which no disparity is available.

10. A method as claimed in claim 1, wherein each of said transformed disparity maps is expressed in terms of a parameterisation.

11. A method as claimed in claim 10, wherein parameters of said parameterisation comprise a viewpoint parameter, a position, and a scale factor of said transformation.

12. A method as defined in claim 10, wherein said parameterisation comprises parameters of said transformation between each of said disparity maps and said disparity map of said common coordinate system, which said parameters are determined using a search procedure.

13. A method as claimed in claim 12, wherein said search procedure comprises minimising squared distances between disparity values at points of each of said disparity maps and said disparity map of said common coordinate system.

14. A method as claimed in claim 12, wherein said search procedure comprises maximising a mutual information of each of said disparity maps and said disparity map of said common coordinate system.

15. A method as claimed in claim 14, wherein said mutual information comprises a measure of a dependence between (i) a joint probability distribution, and (ii) a product distribution of disparities in each of said disparity maps and said disparity map of said common coordinate system.

16. A method as claimed in claim 12, wherein said search procedure comprises a Golden Section search.

17. A method as claimed in claim 1, where said single representation of said step (d) comprises an average of said transformed disparity maps.

18. A method as claimed in claim 17, wherein said average is a weighted average.

19. A method as claimed in claim 18, wherein said weighted average has weights derived from uncertainties in each of said disparity maps.

20. A method as claimed in claim 18, wherein said weighted average has weights based upon an index of each of said disparity maps.

21. A method as claimed in claim 1, applied to an output of a stereo-matching algorithm.

22. A method of generating a depth map of a scene, including a method of processing image data, said method comprising the steps of:
   (a) providing a plurality of images of a scene;
   (b) generating a disparity map for each of at least two pairs of images from said plurality of images;
   (c) transforming each of said disparity maps into a common coordinate system; and
   (d) merging said transformed disparity maps to provide a single representation of depth information of said scene.

23. A method of synthesising a novel view of a scene, comprising generating depth information for the novel view in accordance with a method of generating a depth map of a scene, including a method of processing image data, said method comprising the steps of:
   (a) providing a plurality of images of a scene;
   (b) generating a disparity map for each of at least two pairs of images from said plurality of images;
   (c) transforming each of said disparity maps into a common coordinate system; and
   (d) merging said transformed disparity maps to provide a single representation of depth information of said scene.

24. A method of evaluating a stereo-matching algorithm, said method comprising:
   (i) providing a plurality of images of a scene;
   (ii) generating a disparity map for each of at least two pairs of images from said plurality of images;
   (ii) transforming each of said disparity maps into a common coordinate system, each of said transformed disparity maps being expressed in terms of a parameterisation;
   (iv) merging said transformed disparity maps to provide a single representation of depth information of said scene; and
   (v) optimising a consistency measure with respect to said parameterisation, a value of said consistency measure being indicative of a performance of said algorithm.

25. A method of determining parameter settings for a stereo-matching algorithm, said method comprising:
   (i) providing a plurality of images of a scene;
   (ii) generating a disparity map for each of at least two pairs of images from said plurality of images;
   (iii) transforming each of said disparity maps into a common coordinate system, each of said transformed disparity maps being expressed in terms of parameterisation.
   (iv) merging said transformed disparity maps to provide a single representation of depth information of said scene;
   (v) optimising a consistency measure with respect to said parameterisation and;
   (vi) varying parameters of said parameterisation and repeating said steps (i) to (v) until at least two of said disparity maps achieve a substantially fixed measure of consistency.

26. A program stored on a computer-readable medium for controlling a computer to perform a method of processing image data, said method comprising the steps of:
   (a) providing a plurality of images of a scene;
   (b) generating a disparity map for each of at least two pairs of images from said plurality of images;
   (c) transforming each of said disparity maps into a common coordinate system; and
   (d) merging said transformed disparity maps to provide a single representation of depth information of said scene.

27. An apparatus for processing image data comprising:
   (a) means for providing a plurality of images of a scene;
   (b) means for generating a disparity map for each of at least two pairs of images from said plurality of images;
   (c) means for transforming each of said disparity maps into a common coordinate system; and
   (d) means for merging said transformed disparity maps to provide a single representation of depth information of said scene.

* * * * *